H. B. FREY.
AUXILIARY BRAKE FOR MOTOR VEHICLES.
APPLICATION FILED JAN. 20, 1920.

1,401,597.   Patented Dec. 27, 1921.

Inventor
Harvey B. Frey.

By

Attorney

UNITED STATES PATENT OFFICE.

HARVEY B. FREY, OF READING, PENNSYLVANIA.

AUXILIARY BRAKE FOR MOTOR-VEHICLES.

1,401,597.  Specification of Letters Patent.  Patented Dec. 27, 1921.

Application filed January 29, 1920. Serial No. 352,661.

*To all whom it may concern:*

Be it known that I, HARVEY B. FREY, a citizen of the United States, residing at Reading, in the county of Berks and State of Pennsylvania, have invented certain new and useful Improvements in an Auxiliary Brake for Motor-Vehicles, of which the following is a specification.

My invention relates to improvements in auxiliary brakes for motor vehicles being more particularly designed for use in connection with Ford automobiles, the primary object of the invention lying in the capability of its use in conjunction with the primary brakes of the car, thus insuring at all times absolute safety and control in the operation of the machine.

A further object of the invention lies in the provision of a device as mentioned above which may be readily mounted for operation without the necessity of remodeling the parts, or without interfering with the operation of the primary brakes.

A further object of the invention lies in the novel construction of the bracket adapted for use in connection with the brakes which is simple in construction, reliable in operation, and inexpensive to manufacture.

Other objects and advantages of the invention will be apparent during the course of the following description.

In the accompanying drawings forming a part of this specification and in which like numerals are employed to designate like parts throughout the same, Figure 1 is a fragmentary plan view showing the application of my auxiliary brake;

Figure 1:
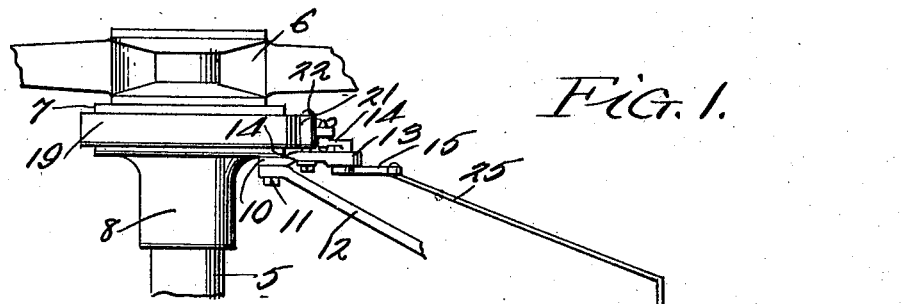
Figure 2:
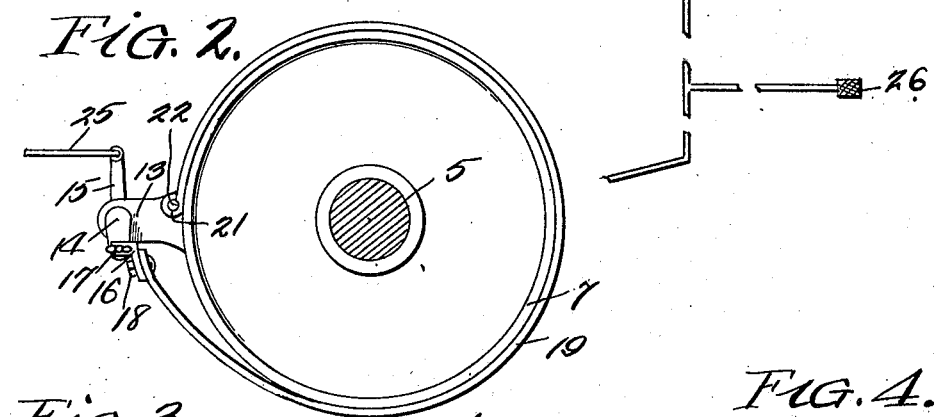
Fig. 2 is a section through the brake drum showing the connection of the brake band with the bracket.
Figure 3:
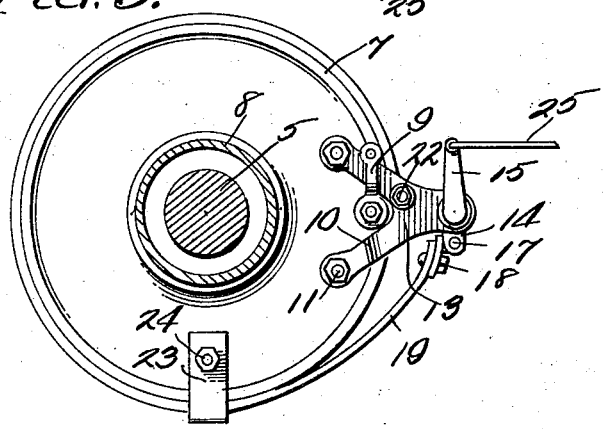
Fig. 3 is a side view of the brake band showing the manner in which the bracket is attached thereto.
Figure 4:
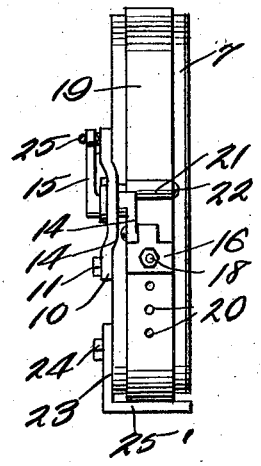
Fig. 4 is a detail front view of the brake band with my invention applied thereto.

In the drawings, wherein for the purpose of illustration I have shown a preferred embodiment of my invention, the numeral 5 designates the rear axle of a motor vehicle with wheels 6 having the usual brake drum 7 mounted upon their outer end. The inner face of the brake drums are closed by brake band housings 8 which are mounted on the axle 5. This structure is conventional and is merely illustrated for the purpose of insuring clearness in the description. The housing described incloses the mechanism of the primary brakes which include internal brake shoes that coöperate with the drum, being operated by the brake cam lever 9 as clearly shown in Fig. 3. This detail structure of the brake mechanism has not been shown, since this forms no part of this invention.

My invention resides in the provision of an additional brake of the contracting band type which is applied and operates in conjunction with the brake drum without interfering with the operation of the primary brakes. The principal part of the invention is the supporting bracket 10 which is of a substantial Y shaped structure being attached to the inner housing of the brake drum by the same bolts 11 which connect the radius rod 12 thereto. The bracket is secured adjacent the peripheral edge of the drum so that the stem 13 will project therebeyond being slightly offset, as at 14, so as to be on a plane with the marginal edge of the drum. The outermost end of the stem 13 is provided with a bearing through which is journaled a short shaft having connected to one of its ends a short lever 14 and its opposite end a long lever 15. These levers extend in downwardly and upwardly directions respectively and are rigidly connected to the shaft so as to move in unison. A bracket 16 of substantially angular shape is connected to the outer side of the lowermost end of the lever 14 by the bolt 17. The other side of the bracket depends downwardly and has passing therethrough a bolt 18.

Coöperating with each brake drum is a resilient brake band 19 which encircles the drum and has one of its ends provided with a series of openings 20 which permit adjustment of the band to the bracket 16, through the medium of the bolt 18. The opposite end of the band is bent upon itself to form a sleeve 21 which receives the laterally projecting bolt or pin 22 which passes through the bracket 13, at a point so as to pass directly across the outer surface of the drum 7. A bracket or guide plate 23 is fixedly secured to the housing of the brake drum by the bolt 24 and has a laterally projecting arm 25' which extends across the surface of the drum beneath the brake band for the purpose of guiding the same. The lever 15 has a brake lever 25 extending from its upper end and is connected to the foot pedal 26, which is also used for the application of the primary brakes.

In use, the bracket 13 may be attached to any brake drum of the conventional type being interposed between the ends of the radius rod and the casing of the brake drum. The bracket is supported by the bolts 11 which pass through the radius rod and the casing of the brake drum. The brake band 19 which has one end connected to the bracket is encircled about the brake drum and has its opposite ends adjusted to the desired tension through the medium of the bracket 16. When it is desired to apply the brakes, pressure is exerted upon the foot pedal 26 which in turn rocks the lever 15 so as to tighten the band and bring it into engagement with the drum. Thus it is obvious from the foregoing that a very simple and novel auxiliary brake for automobiles and other motor vehicles has been provided which may be attached to the machine without the necessity of extensive changes.

It is to be understood that the form of my invention herewith shown and described is to be taken as a preferred example of the same, and that certain changes in the shape, size, and arrangement of parts may be resorted to without departing from the spirit of the invention or the scope of the subjoined claim.

Having thus fully described my invention, what I claim is:—

In combination with the brake drum of a vehicle, a substantially Y-shaped bracket secured to the brake drum housing, the stem of said bracket extending radially therefrom and projecting beyond the peripheral edge thereof, levers of different lengths journaled in the outermost end of said stem, said levers being movable in unison, a brake band encircling the outer circumference of said drum, with one end bent upon itself forming a sleeve to receive a pin projecting from the bracket, an angular bracket adjustably joined to the opposite end of the band, said plate being associated with the shortest of the said levers, and means connected with the other lever for contracting the band to bring it into engagement with the drums.

In testimony whereof, I have affixed my signature in the presence of two witnesses.

HARVEY B. FREY.

Witnesses:
CHARLES E. STUMP,
W. R. KEMMERER.